United States Patent Office 3,156,683
Patented Nov. 10, 1964

3,156,683
PURIFICATION OF CAPROLACTAM
Ollie W. Chandler, Terre Haute, Ind., assignor to Commercial Solvents Corporation, New York, N.Y., a corporation of Maryland
No Drawing. Filed Sept. 23, 1959, Ser. No. 841,667
5 Claims. (Cl. 260—239.3)

My invention relates to the purification of epsilon-caprolactam and, more particularly, it relates to the purification of partially pure epsilon-caprolactam by sparging an inert gas into refluxing impure caprolactam, condensing purified caprolactam and then distilling the thus purified material.

For the purpose of brevity, the term "caprolactam" is used herein to mean epsilon-caprolactam. A generally used process for the preparation of caprolactam is the Beckmann rearrangement of cyclohexanone oxime with 100% sulfuric acid. The caprolactam is then recovered by neutralizing the reaction mixture with a base, removing the resulting aqueous caprolactam and distilling off the water. Further purification of caprolactam has presented many problems mainly because of its broad solvent power. Contaminants which remain with the caprolactam through persistant purification treatments, including distillation, not only produce discoloration but prohibit the formation of polymers useful in the manufacture of polymeric articles such as fibers, films and other molded products.

Contaminated caprolactam can be purified by first adding small amounts of substances possessing oxidizing or reducing properties, for example, permanganates, perborates, mixtures of zinc and sulfuric acid, or mixtures of zinc and sodium hydroxide, and then distilling the thus-treated caprolactam in vacuo. Also, caprolactam has been purified by treating the same with hydrogen in the presence of a hydrogenation catalyst and subsequently distilling off the caprolactam. Further purification has been attempted by treating with cation or anion exchange resins or cation and anion mixed ion exchange resins.

The above-mentioned purification procedures all suffer from certain disadvantages. The greatest of these disadvantages is the failure to remove a yet unidentified volatile base present in caprolactam when produced by the Beckmann rearrangement of cyclohexanone oxime which, to meet specifications required by the industry, cannot be present in amounts exceeding 25 p.p.m. This unidentified volatile base, the amount of which is calculated quantitatively as ammonia, when present in caprolactam in excess of 25 p.p.m. inhibits the formations of polymers of molecular weights desirable for the formation of polymeric products, especially fibers.

I have now discovered a process whereby caprolactam containing less than 25 p.p.m. volatile base can be economically produced.

My new process for the purification of caprolactam containing less than 25 p.p.m. volatile base involves essentially refluxing substantially anhydrous caprolactam at pressures ranging from about 5 to about 50 mm. at liquid temperatures ranging from about 115 to about 175° C. while continually bubbling through the liquid caprolactam a gas inert to caprolactam and volatile base, condensing the vaporized refluxing caprolactam at temperatures ranging from about 20° to about 100° C., continuing the reflux until the caprolactam contains less than 25 p.p.m. volatile base and then distilling the caprolactam at temperatures ranging from about 115 to about 175° C. at pressures ranging from about 5 to about 50 mm.

As indicated, other impurities are present in caprolactam besides volatile base. In carrying out my invention, I prefer, therefore, to first remove impurities other than volatile base.

One suitable method for removing impurities other than volatile base is by the process set forth in U.S. Patent No. 2,786,052, issued March 19, 1957, to Leonard W. F. Kampschmidt, which consists essentially of treating impure caprolactam with hydrogen under pressure in the presence of a hydrogenation catalyst. According to this purification process, hydrogen under pressure in the presence of a hydrogenation catalyst is passed through an aqueous solution of caprolactam containing preferably from about 15 to about 30% by weight of caprolactam based on the weight of the aqueous solution at a temperature below the boiling point of the solution. The caprolactam then may be recovered from the solution by distillation. Any other suitable means for removing impurities can be employed in my invention.

The substantially anhydrous impure caprolactam is then subjected to my new purification process to obtain a caprolactam product useful in formation of polymers. The impure material is first refluxed at liquid temperatures ranging from about 115° C. to about 175° C. and at pressures ranging from about 5 to about 50 mm. while continually bubbling through the liquid caprolactam a gas inert to caprolactam and the vaporized refluxing caprolactam is condensed at temperatures ranging from about 20° C. to about 100° C. until no more than 25 p.p.m. of volatile base remains in the caprolactam. I prefer to use a liquid temperature of about 160° C., a pressure of about 30 mm. and a condensing temperature of 100° C. Examples of gases inert to caprolactam which are useful in my process include nitrogen, neon, argon, xenon, carbon dioxide, methane, hydrogen, and the like. I prefer to use nitrogen.

If the contaminated caprolactam contains a substantial amount of volatile base, it is advantageous in order to shorten the reflux and distillation time, to add to the caprolactam from about 0.1 to about 1.0% by weight of sodium hydroxide based on the weight of caprolactam before refluxing and treating with inert gas. Following reflux and inert gas treatment, the caprolactam containing less than 25 p.p.m. volatile base is then distilled at liquid temperatures ranging from about 115 to about 175° C. and at pressures ranging from about 5 to about 50 mm. and then recovered. I prefer to use a temperature of about 135° C. and a pressure of about 10 mm.

The following example is offered to illustrate my invention. However, I do not intend to be limited to the specific materials, proportions or procedures employed. Various equivalents of my process will obviously occur to those skilled in the art and I intend to include such equivalents.

*Example I*

298 grams of substantially anhydrous caprolactam containing 168 p.p.m. volatile base obtained by the Beckmann rearrangement of cyclohexanone oxime were refluxed at 163° C. and at 30 mm. pressure for one hour while condensing the refluxing caprolactam at 100° C. and bubbling nitrogen at approximately 400 ccs. per minute through liquid caprolactam. At the end of the one hour period, the residue was cooled to 135° C. and the pressure reduced to 10 mm. Caprolactam was then distilled yielding 265.7 grams of caprolactam (92.2% recovery) with a volatile base content of 9.3 p.p.m.

Now having described my invention, what I claim is:
1. In a process for the purification of caprolactam produced by the Beckmann rearrangement of cyclohexanone oxime, the steps which comprise refluxing substantially anhydrous caprolactam at pressures ranging from about 5 to about 50 mm. and at liquid temperatures ranging from about 115 to about 175° C., while continually bubbling through the liquid caprolactam a gas inert to caprolactam selected from the group consisting of nitrogen, neon, argon, xenon, carbon dioxide, methane, and hydrogen, condensing the refluxing caprolactam at temperatures ranging from about 20° C. to about 100° C., said reflux being continued until the caprolactam contains less than 25 p.p.m. of volatile base calculated quantitatively as ammonia and then distilling the caprolactam at temperatures ranging from about 115 to about 175° C. and at pressures ranging from about 5 to about 50 mm.

2. The process of claim 1 wherein volatile base is removed at a temperature ranging from about 160 to about 165° C. and at a pressure of about 30 mm.

3. The process of claim 1 wherein the caprolactam is distilled at a temperature of 135° C. and at a pressure of 10 mm.

4. The process of claim 1 wherein the caprolactam is condensed at 100° C. and the gas inert to caprolactam is nitrogen.

5. In a process for the purification of caprolactam produced by the Beckmann rearrangement of cyclohexanone oxime, the steps which comprise adding to substantially anhydrous caprolactam from about 0.1 to about 1.0% of sodium hydroxide by weight based on the weight of the caprolactam, refluxing the said caprolactam at pressures ranging from about 5 to about 50 mm. and at liquid temperatures ranging from about 115 to about 175° C., while continually bubbling through the liquid caprolactam a gas inert to caprolactam selected from the group consisting of nitrogen, neon, argon, xenon, carbon dioxide, methane, and hydrogen, condensing the refluxing caprolactam at temperatures ranging from about 20° C. to about 100° C., said reflux being continued until the caprolactam contains less than 25 p.p.m. of volatile base calculated quantitatively as ammonia and then distilling the caprolactam at temperatures ranging from about 155 to about 175° C. and at pressures ranging from about 5 to about 50 mm.

References Cited in the file of this patent

UNITED STATES PATENTS

| 2,866,785 | Meier | Dec. 30, 1958 |
| 2,939,865 | Fueg et al. | June 7, 1960 |

FOREIGN PATENTS

| 165,505 | Australia | Oct. 6, 1955 |
| 572,917 | Canada | Mar. 24, 1959 |
| 804,686 | Great Britain | Nov. 19, 1958 |

OTHER REFERENCES

Moelwyn-Hughes: "Physical Chemistry," pages 736–7 (Pergamon Press) (1957).